US011662289B2

(12) United States Patent
Anklin et al.

(10) Patent No.: US 11,662,289 B2
(45) Date of Patent: May 30, 2023

(54) APPARATUS FOR MEASURING VISCOSITIES

(71) Applicant: ENDRESS+HAUSER FLOWTEC AG, Reinach (CH)

(72) Inventors: Martin Josef Anklin, Dornach (CH); Christof Huber, Bern (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 243 days.

(21) Appl. No.: 16/632,625

(22) PCT Filed: Jun. 20, 2018

(86) PCT No.: PCT/EP2018/066460
§ 371 (c)(1),
(2) Date: Jan. 21, 2020

(87) PCT Pub. No.: WO2019/015913
PCT Pub. Date: Jan. 24, 2019

(65) Prior Publication Data
US 2020/0166444 A1 May 28, 2020

(30) Foreign Application Priority Data

Jul. 21, 2017 (DE) ...................... 10 2017 116515.0

(51) Int. Cl.
*G01N 11/16* (2006.01)
*G01F 1/84* (2006.01)
(52) U.S. Cl.
CPC ........... *G01N 11/16* (2013.01); *G01F 1/8477* (2013.01); *G01F 1/8495* (2013.01)
(58) Field of Classification Search
CPC ..... G01F 1/8472; G01F 1/8477; G01N 11/16; G01N 11/162
See application file for complete search history.

(56) References Cited

U.S. PATENT DOCUMENTS

2004/0255648 A1  12/2004  Sparks
2008/0184813 A1  8/2008  Patten et al.

FOREIGN PATENT DOCUMENTS

CN  101147047 A  3/2008
CN  102472653 A  5/2012
(Continued)

OTHER PUBLICATIONS

International Search Report in corresponding International Application No. PCT/EP2018/066460, dated Sep. 20, 2018.
(Continued)

*Primary Examiner* — Erika J. Villaluna
(74) *Attorney, Agent, or Firm* — Bacon & Thomas, PLLC

(57) ABSTRACT

An apparatus for measuring viscosities of fluids is described, comprising: a measuring system (1) having at least one measuring tube (5), which in measurement operation is filled with a fluid or through which fluid is flowing, and which has at least one tube section (4, 7) excitable to execute oscillations; an exciter system (1) for exciting at least two wanted oscillation modes of different frequencies, at each of which at least one of the tube sections (4, 7) is excited to execute oscillations, especially resonant oscillations; a sensing system (3), which is embodied in such a manner that it determines for the wanted oscillation modes excited in measurement operation, in each case, a frequency and a damping, especially a frequency, an amplitude and a damping, of a resulting oscillation of at least one tube section (4, 7) excited to execute oscillations of one of the wanted oscillation modes, and an evaluation system (15), which is embodied in such a manner that it determines based on calibration data stored in a memory (17) for the individual wanted oscillation modes excited in measurement operation, in each case, based on an excitation determined frequency and damping, especially frequency, amplitude and damping, of the resulting oscillation a measured shear rate value and (Continued)

Figure 1:
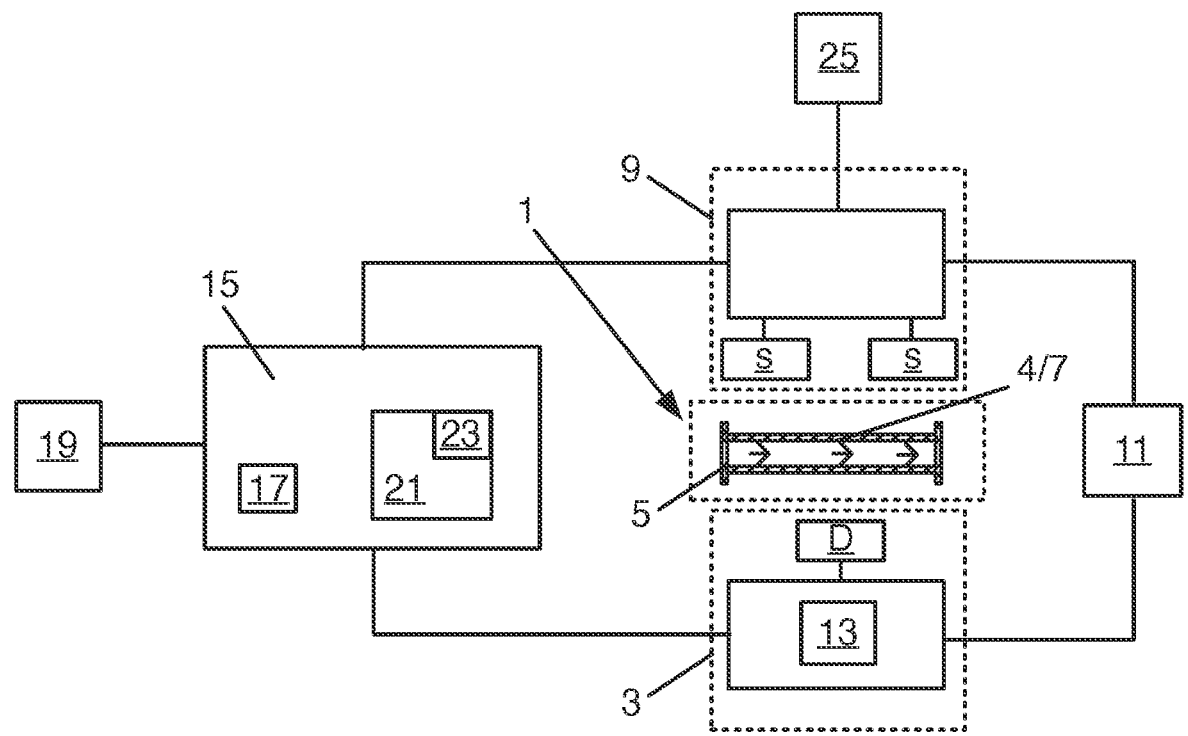

a viscosity measured value, wherein the viscosity measured value corresponds to the dynamic viscosity of the fluid at a static shear rate corresponding to the shear rate value.

12 Claims, 3 Drawing Sheets

(56) References Cited

FOREIGN PATENT DOCUMENTS

| CN | 103534558 A | 1/2014 |
|---|---|---|
| DE | 10 2004 014 029 A1 | 10/2005 |
| DE | 10 2004 021 690 A1 | 11/2005 |
| EP | 1154254 A1 | 11/2001 |
| WO | 02/103327 A1 | 12/2002 |
| WO | 2006/097382 A1 | 9/2006 |
| WO | 2006 104485 A1 | 10/2006 |
| WO | 2011/061009 A1 | 5/2011 |
| WO | 2012/146614 A1 | 11/2012 |

OTHER PUBLICATIONS

German Search Report in corresponding German Application No. DE 10 2017 116 515.0, dated Apr. 4, 2018.
Office Action dated Nov. 18, 2021 in corresponding Chinese Application No. 201880047922.4.
Office Action dated May 13, 2022, in corresponding European Application No. 18 733 245.7.
Office Action dated Mar. 31, 2023, in corresponding European Application No. 18 733 245.7.

APPARATUS FOR MEASURING VISCOSITIES

The invention relates to an apparatus for measuring viscosities of fluids, and includes
- a measuring system having at least one measuring tube, which in measurement operation is filled with a fluid or through which fluid is flowing, and which has at least one tube section excitable in measurement operation to execute oscillations,
- an exciter system for exciting at least two wanted oscillation modes of different frequency, at each of which at least one of the tube sections is excited to execute oscillations, especially resonant oscillations, of a wanted oscillation mode, and
- a sensing system, which is embodied in such a manner that it determines for the wanted oscillation modes excited in measurement operation, in each case, a frequency and a damping, especially a frequency, an amplitude and a damping, of the resulting oscillation of at least one tube section excited to execute oscillations at a wanted oscillation mode.

Apparatuses for measuring viscosities of fluids are applied e.g. in industrial measurements technology.

Thus, apparatuses for measuring viscosity of a fluid are described e.g. in EP 1 158 289 B1 and DE 10 2004 021 690 A1, wherein a tube section of a measuring tube, through which fluid is flowing, is excited to execute oscillations of a wanted oscillation mode and viscosity of the flowing fluid is determined based on damping of resulting oscillation dependent on viscosity.

Moreover, DE 10 2004 021 690 A1 describes a Coriolis-mass flow measuring device, which designed for use in applications wherein measured variables of inhomogeneous fluids, e.g. two- or multiphase fluids, are to be determined. For this, DE 10 2004 021 690 A1 describes a method, wherein a straight measuring tube is excited simultaneously or sequentially near in time to lateral- and to torsional oscillations of different frequency and the damping of the resulting lateral oscillation dependent essentially only on the viscosity of the fluid and the damping of the resulting torsional oscillation dependent on the viscosity and the inhomogeneity of the fluid are measured. Derived from the two measured damping are intermediate values, which are then taken into consideration for improving the accuracy of measurement of variables measured with the measuring device, e.g. a mass flow, a density or a viscosity. This method is based on the fact that viscosity of the fluid in the case of the two wanted oscillation modes excited for determining the intermediate values must be the same.

With this method, inhomogeneities can be detected and taken into consideration. The question decisive, among others for the flow behavior and the rheology of fluids, whether the fluid is a Newtonian liquid, cannot, however, be answered thereby. In the same respect, an, in given cases, present, shear rate dependence of viscosity of a fluid can also neither be qualitatively detected nor quantitatively determined with the measuring device described in DE 10 2004 021 690 A1.

It is an object of the invention to provide an apparatus as well as a method, with which shear rate dependent viscosities of fluids can be determined.

To this end, the invention resides in an apparatus for measuring viscosities of fluids, comprising
- a measuring system having at least one measuring tube, which in measurement operation is filled with a fluid or through which fluid is flowing, and which has at least one tube section excitable to execute oscillations,
- an exciter system for exciting at least two wanted oscillation modes of different frequencies, at each of which at least one of the tube sections is excited to execute oscillations, especially resonant oscillations, of a wanted oscillation mode,
- a sensing system, which is embodied in such a manner that it determines for the wanted oscillation modes excited in measurement operation, in each case, a frequency and a damping, especially a frequency, an amplitude and a damping, of a resulting oscillation of at least one tube section excited to execute oscillations at one of the wanted oscillation modes, and
- an evaluation system, which is embodied in such a manner that it determines, based on calibration data stored in a memory for the individual wanted oscillation modes excited in measurement operation, in each case, based on an excitation determined frequency and damping, especially frequency, amplitude and damping, of the resulting oscillation, a shear rate value and a viscosity measured value, wherein the viscosity measured value corresponds to the dynamic viscosity of the fluid at a static shear rate corresponding to the shear rate value.

A first further development provides that the evaluation system is embodied in such a manner that, based on at least two viscosity measured values determined at different shear rate values,
- it creates a viscosity profile reflecting viscosity of the fluid as a function of shear rate,
- it detects whether viscosity of the fluid has a shear rate dependence, and/or
- based on viscosity measured values determined at different shear rate values, it determines whether the fluid is a Newtonian fluid, whose viscosity is essentially independent of shear rate, or is a shear thinning fluid, whose viscosity falls with increasing shear rate, or is a shear thickening fluid, whose viscosity rises with increasing shear rate.

In a second further development, the apparatus includes a detection system for detecting during measurement operation changes of the fluid and/or differences of the viscosity of the fluid from specifications therefor, wherein the detection system is embodied in such a manner that
- it compares viscosity measured values determined at the measured shear rate values, or viscosity measured values determined based on the viscosity profile, with reference values, especially specified desired values stored in a memory or specified desired value ranges stored in a memory and/or viscosity measured values stored in a memory and determined at one or more earlier points in time at shear rate values determined by the apparatus, and
- it detects a change and/or difference, when at least one viscosity measured values differs from a belonging reference value by more than a specified tolerance, especially a tolerance specified as a function of the accuracy of measurement of viscosity measurement or a tolerance specified by a user.

A first embodiment provides that
- the exciter system includes a control system, which controls amplitudes of oscillations resulting from exciting the wanted oscillation modes, in each case, to a constant value, and
- the sensing system is embodied in such a manner that it determines damping, in each case, based on a measure ascertained by means of an energy requirement measuring system for an energy requirement required in the case of exciting a wanted oscillation mode for maintaining resulting oscillations at constant amplitude.

A third further development provides that
the calibration data comprise data ascertained for each wanted oscillation mode in earlier calibration procedures, via which shear rate values and viscosity measured values are associated with damping and frequencies, especially damping, frequencies and amplitudes, measured in measurement operation upon exciting the wanted oscillation modes, or the calibration data comprise data ascertained for each wanted oscillation mode in earlier calibration procedures, via which viscosity measured values are associated with damping measured in measurement operation upon exciting the wanted oscillation modes and shear rate values are associated with measured frequencies, wherein the shear rate values essentially equal $2\pi$ times frequency of a resulting oscillation of a particular tube section.

A second embodiment provides that the apparatus includes, connected to the sensing system, a measuring unit, which is embodied in such a manner that in measurement operation it determines a mass flow and/or a density of the fluid based on an oscillation resulting in the case of exciting at least one of the wanted oscillation modes.

A fourth further development provides that
the wanted oscillation modes have frequencies of less than or equal to 1600 Hz, especially less than or equal to 1000 kHz, especially less than or equal to 800 Hz, especially from 100 Hz to 800 Hz, and/or the one or more tube sections excitable to wanted oscillations have, in each case, a tube radius, which is greater than a penetration depth, to which shear waves forming upon exciting the tube section to execute oscillations of a wanted oscillation mode penetrate into the fluid starting from a tube wall of the tube section and extending into the fluid.

A fifth further development provides that
the evaluation system is embodied in such a manner that it determines shear rate value and viscosity measured value for the individual wanted oscillation modes excited in measurement operation, in each case, based on an excitation determined frequency, amplitude and damping of resulting oscillations, or a tube radius and a length or sublength of each tube section deflected upon the exciting of a wanted oscillation mode are dimensioned, in each case, in such a manner that frequencies and damping of oscillations resulting from exciting the individual wanted oscillation modes have, in each case, no or only a low dependence on the amplitudes of the resulting oscillations and the evaluation system is embodied in such a manner that it determines shear rate value and viscosity measured value for the individual wanted oscillation modes excited in measurement operation, in each case, based on excitation determined frequencies and damping of resulting oscillations.

A sixth further development provides that
the fluid has a complex viscosity, which includes a contribution attributable to elastic properties and a contribution attributable to viscous properties, and the contribution attributable to viscous properties is large compared with the contribution attributable to elastic properties, wherein the complex viscosity has especially essentially exclusively elastic properties, the one or more tube sections excitable to wanted oscillations have, in each case, a tube radius, which is greater than or equal to ten times a penetration depth, to which shear waves forming upon exciting the tube section to execute oscillations of a wanted oscillation mode penetrate into the fluid starting from a tube wall of the tube section and extending into the fluid, and the evaluation unit is embodied in such a manner that it determines a viscosity measured value based on damping of a resulting oscillation of a particular tube section during excitation of its wanted oscillation mode and an associated measured shear rate based on frequency of a resulting oscillation of the particular tube section.

Furthermore, the invention includes a method for measuring viscosities of a fluid, in the case of which measurements are performed for at least two wanted oscillation modes of different frequencies, comprising method steps as follows, in each case, at least one tube section of at least one measuring tube, which is filled with a fluid and/or through which fluid is flowing, is excited by means of an exciter system to execute oscillations, especially resonant oscillations, of the wanted oscillation modes, a frequency and a damping, especially a frequency, an amplitude and a damping, of the resulting oscillation of at least one tube section excited to execute oscillations of each wanted oscillation mode is determined, and shear rate values and viscosity measured values are determined based on calibration data determined by a calibration procedure and wanted mode excitation determined frequencies and damping, especially frequencies, amplitudes and damping, of resulting oscillations, wherein the viscosity measured values correspond to dynamic viscosities of the fluid at static shear rates corresponding to shear rate values.

A first further development of the method provides that
the wanted oscillation modes have frequencies of less than or equal to 1600 Hz, especially less than or equal to 1000 kHz, especially less than or equal to 800 Hz, especially from 100 Hz to 800 Hz, and/or the one or more tube sections excitable to wanted oscillations have, in each case, a tube radius, which is greater than a penetration depth, to which shear waves forming upon exciting the tube section to a wanted oscillation penetrate into the fluid starting from a tube wall of the tube section and extending into the fluid.

A second further development of the method provides that
the fluid has a complex viscosity, which has a contribution attributable to elastic properties and a contribution attributable to viscous properties, and the contribution attributable to viscous properties is large compared with the contribution attributable to elastic properties, wherein the complex viscosity has especially essentially exclusively elastic properties, the one or more tube sections excitable to wanted oscillations have, in each case, a tube radius, which is greater than or equal to ten times a penetration depth, to which shear waves forming upon exciting the tube section to execute oscillations of a wanted oscillation mode penetrate into the fluid starting from a tube wall of the tube section and extending into the fluid, and the viscosity measured value is determined based on the damping of resulting oscillation of the tube section determined during excitation of its wanted oscillation mode and the associated shear rate value is determined based on frequency of a resulting oscillation of the tube section.

A third further development of the method provides that in the calibration procedure for each of the individual wanted oscillation modes reference measurements are performed, in the case of which the wanted oscillation mode is excited while the corresponding tube section is filled with a reference fluid and/or is flowed through by the reference fluid and damping and frequency, especially damping, frequency and amplitude, of the oscillation resulting from exciting each wanted oscillation mode are measured, wherein the reference measurements comprise reference measurements performed with Newtonian reference fluids of different, known, dynamic viscosities, and wherein there is associated with each measured frequency a shear rate value, which essentially equals $2\pi$ times frequency of a resulting oscillation of a particular tube section and/or the reference measurements comprise reference measurements performed with non-Newtonian reference fluids with viscosity dependent in known manner on shear rate, wherein the reference measurements comprise especially reference measurements performed with reference fluids with differently strongly developed elastic properties compared with their viscous properties, and for each wanted oscillation mode calibration data are determined, via which a shear rate value and a viscosity measured value are associated with damping and frequency, especially damping, frequency and amplitude, measured in measurement operation upon exciting the wanted oscillation mode.

A third further development of the method provides that, based on at least two viscosity measured values determined at different shear rate values, a viscosity profile reflecting viscosity of the fluid as a function of shear rate is created, it is detected whether viscosity of the fluid has a shear rate dependence, and/or, based on viscosity measured values determined at shear rate values, it is determined whether the fluid is a Newtonian fluid, a shear thinning fluid or a shear thickening fluid.

A fourth further development of the method provides that changes of the fluid and/or differences of the viscosity of the fluid from specifications therefor occurring during measurement operation are detected, in that viscosity measured values determined at measured shear rate values are compared with reference values, especially with specified desired values, with specified desired value ranges or with viscosity measured values determined at one or more earlier points in time at measured shear rate values, and a change and/or difference is detected, when at least one viscosity measured value deviates from a belonging reference value by more than a specified tolerance, especially a tolerance specified as a function of an accuracy of measurement of viscosity or a tolerance specified by a user.

Figure 2:
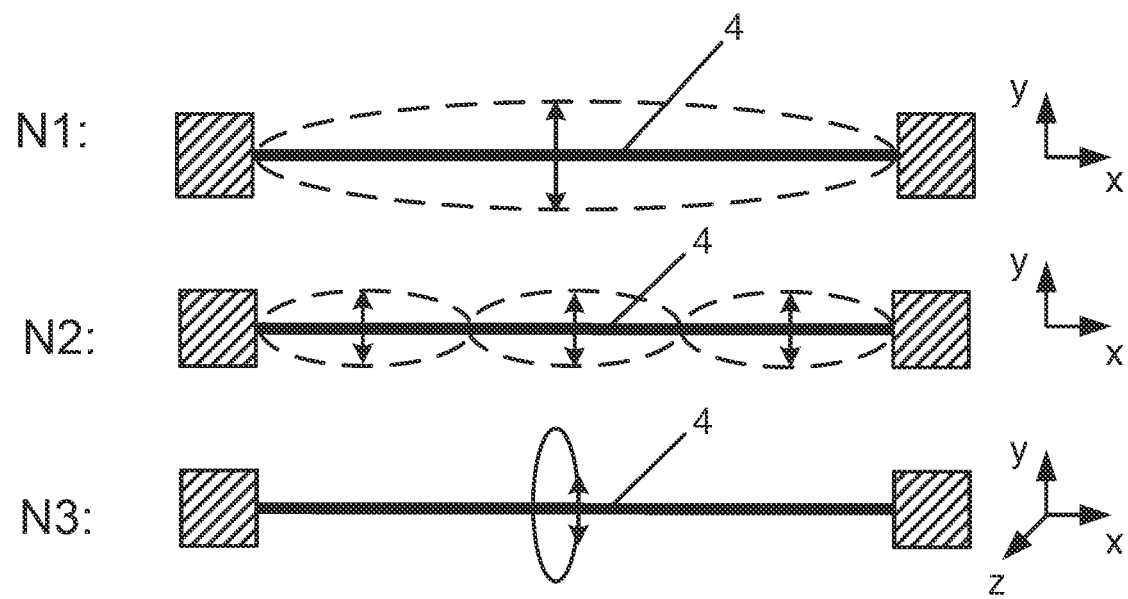
Figure 3:
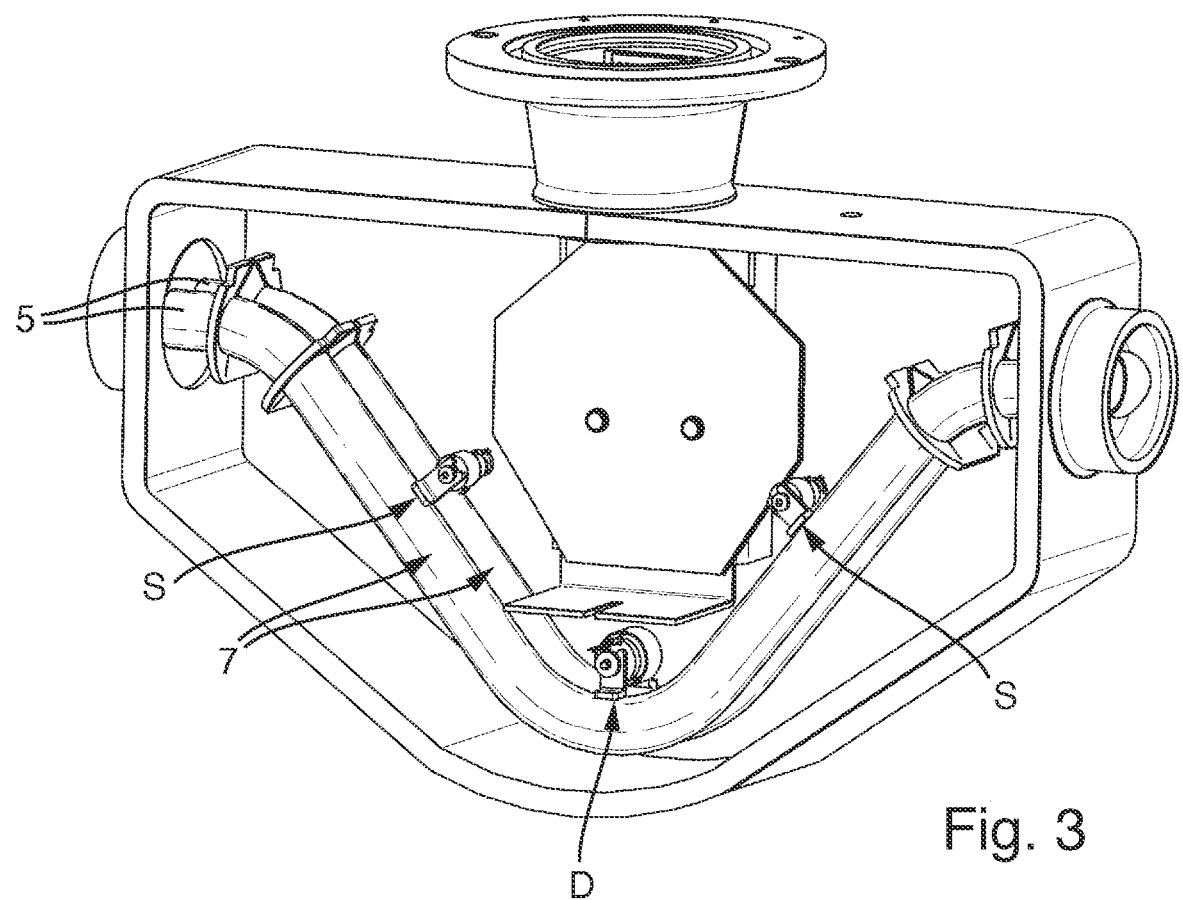
Figure 4:
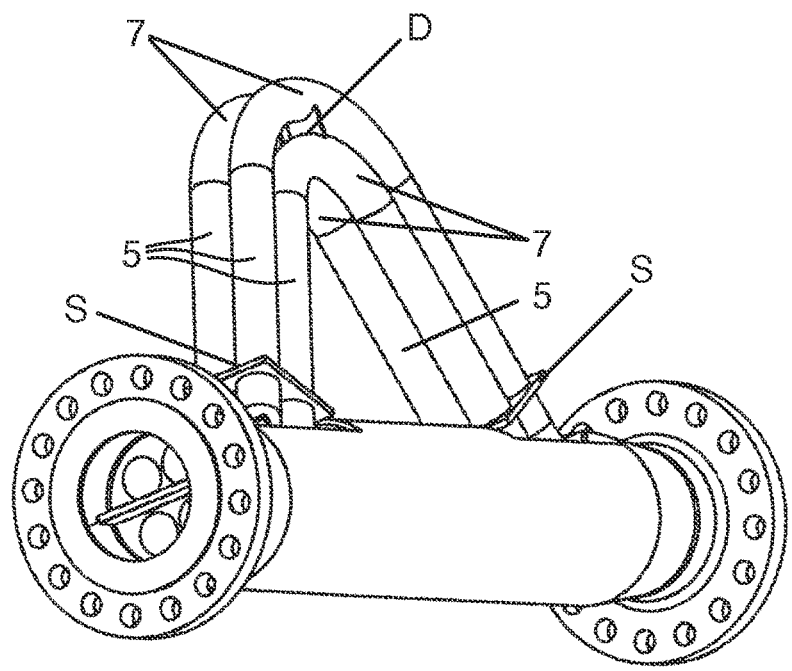
Figure 5:
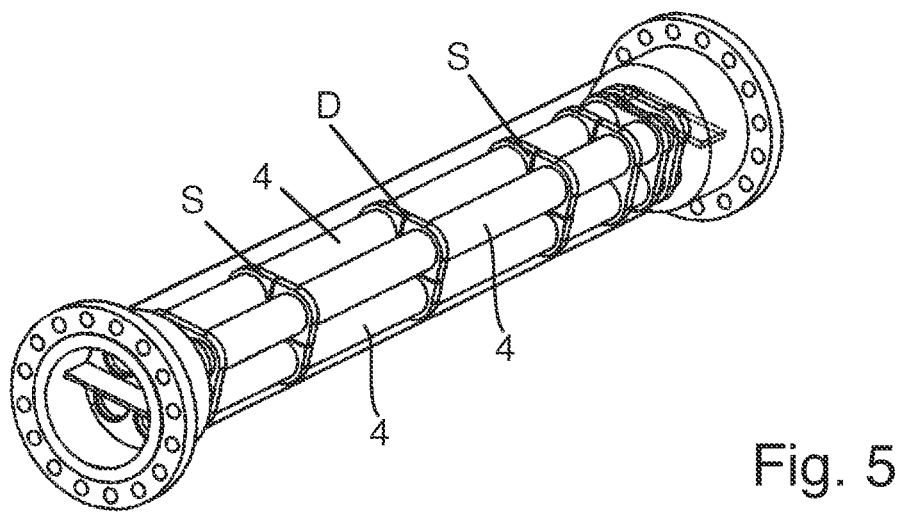

The invention and other advantages will now be explained in greater detail based on the figures of the drawing, in which examples of embodiments are shown; equal parts are provided in the figures with equal reference characters. The figures of the drawing show as follows:

FIG. 1 an apparatus of the invention;

FIG. 2 by way of example, three wanted oscillation modes corresponding, in each case, to an eigenoscillation mode of a straight tube section;

FIG. 3 an example of an embodiment of a measuring system;

FIG. 4 a measuring system with four measuring tubes having curved tube sections; and FIG. 5 a measuring system with four measuring tubes having straight tube sections.

FIG. 1 shows an apparatus of the invention for measuring viscosities of fluids. The apparatus includes, illustrated in FIG. 1 only as a function block, a measuring system 1, which includes at least one measuring tube, which in measurement operation is filled with a fluid or flowed through by the fluid and which has at least one tube section excitable to execute oscillations.

Furthermore, the apparatus includes an exciter system 3 for exciting at least two wanted oscillation modes of different frequencies, wherein, in each case, at least one of the tube sections is excited to execute oscillations, especially resonant oscillations, of one of the wanted oscillation modes. For this, the exciter system 3 is embodied in such a manner that by it in measurement operation at least one of the provided tube sections is excitable to execute oscillations of a first wanted oscillation mode and at least one of the provided tube sections is excitable to execute oscillations of at least one additional wanted oscillation mode. The individual wanted oscillation modes correspond preferably to eigenoscillation modes of their tube sections. In such case, it depends on the embodiment of the tube sections to be excited and the form of the wanted oscillation modes, whether the exciting of the individual wanted oscillation modes and the evaluation to be described below of the oscillations resulting for the individual wanted oscillation modes can occur simultaneously or must be embodied to occur time sequentially.

For performance of the measuring method of the invention, it is sufficient to use just one measuring system 1 with only a single measuring tube with only a single tube section, which can be excited to execute oscillations of a first and at least one additional wanted oscillation mode having another frequency. An example for this is a measuring system having at least one measuring tube, which has e.g. at least one tube section excitable to execute torsional- and/or bending oscillations.

Thus, the measuring system 1 can comprise e.g. a straight tube section 4 affixed on its oppositely lying ends. Such a tube section 4 can be excited e.g. in eigenoscillation modes executing lateral oscillations. In such case, the tube section 4 is excited to execute oscillations in a plane of oscillation x-y defined by its longitudinal axis x and an axis y extending perpendicularly to its longitudinal axis x, wherein it experiences deflections directed perpendicularly to its longitudinal axis x. These eigenoscillation modes include a fundamental oscillation mode shown in FIG. 2 as the first wanted oscillation mode N1, wherein the defection amplitudes occurring perpendicularly to the longitudinal axis x form a single oscillatory antinode. Moreover, the eigenoscillation modes include a harmonic of the N1 eigenoscillation mode shown in FIG. 2 as a next higher, symmetric, second wanted oscillation mode N2 and accordingly developing three oscillation antinodes. Alternatively or supplementally, straight tube sections 4 can be excited to eigenoscillations formed as torsional oscillations about a rotational axis extending through the two affixed ends of the tube section 4. FIG. 2 shows, as an example of this a third wanted oscillation mode N3 embodied as a purely torsional oscillation mode.

Alternatively, also a measuring system 1 can be used, which has at least one tube section having another form. Examples in such case are measuring systems 1, which have at least one measuring tube, which includes a curved, bent, u-shaped, v-shaped and/or at least one Ω shaped tube section excitable to execute oscillations of a predetermined, wanted oscillation mode. Alternatively, the measuring system 1 can, however, also comprise two or more measuring tubes connected with one another for parallel or serial flow, of which at least one has one or more serially flowed through, tube sections excitable to execute oscillations, wherein these tubes sections can also here have, in each case, e.g. one of the aforementioned forms.

FIG. 3 represents as an example of an embodiment a measuring system 1, which has two measuring tubes 5 extending essentially in parallel with one another, each of which has a, for example curved, tube section 7 fixedly mechanically secured on its oppositely lying ends and excitable to execute oscillations. In this example of an embodiment, the wanted oscillation modes preferably comprise eigenoscillation modes of the tube sections 7, e.g. a fundamental mode and a higher mode of combined torsion and bending oscillations, wherein the tube sections 7 are excited to execute oscillations about a torsion axis extending through their clamped ends.

FIG. 4 shows a further example of an embodiment of a measuring system 1, which has, connected in parallel with one another in the flow direction, four measuring tubes 5, each of which has a curved tube section 7, which is mechanically fixedly clamped at its oppositely lying ends and which is excitable to execute oscillations.

FIG. 5 shows a further example of an embodiment of a measuring system 1, which has, connected in parallel with one another in the flow direction, four measuring tubes, each of which has at least one straight tube section 4, which is mechanically fixedly clamped at its oppositely lying ends and which is excitable to execute oscillations.

The measuring systems 1 illustrated in FIGS. 4 and 5 are preferably operated in such a manner that each two of the four measuring tubes form a measuring tube pair, whose tube sections 4, or 7, arranged in parallel with one another, are, in each case, excited to execute oscillations, preferably to opposite phase oscillations, of at least one of the wanted oscillation modes described above in connection with FIG. 2 for straight tube sections 4, or in connection with FIG. 3 for curved tube sections 7. In such case, operation is preferably in such a manner and/or the tube sections 4, or 7 are preferably embodied in such a manner that the frequencies of the wanted oscillation modes of the tube sections 4, or 7, of the two measuring tube pairs are different.

The exciting of the individual wanted oscillation modes of the tube sections 4, 7 of the measuring system 1 occurs preferably via one or more drives D of the exciter system 3 acting, in each case, on a region of the particular tube section 4, 7 selected corresponding to the wanted oscillation mode to be excited. Suited for this are especially drives, e.g. electrostatic, piezoelectric or magnetic drives, D applied in the present state of the art in Coriolis mass flow measurement devices or density measuring devices for exciting wanted oscillation modes. Corresponding drives D, as well as their number and arrangement required for exciting wanted oscillation modes are known to those skilled in the art and are, consequently, not described here in detail. Exciter system 3 comprises in the example of an embodiment illustrated in FIGS. 1 and 3, acting on the halfway point of the arc shaped tube sections 7 in FIG. 3, a drive D, which is preferably embodied in such a manner that it excites the parallel tube sections 7 to oscillations of opposite phase.

Additionally, the apparatus includes a sensing system 9, which is embodied in such a manner that it determines for the individual wanted oscillation modes excited in measurement operation, in each case, a frequency and a damping of a resulting oscillation of at least one tube section 4, 7 excited to execute oscillations of a wanted oscillation mode. As explained hereinafter in detail, there are embodiments of the apparatus of the invention, in the case of which it is required supplementally to the frequencies of the resulting oscillations also to register their amplitudes. In that case, the sensing system 9 is embodied in such a manner that it determines frequency, amplitude and damping of resulting oscillations.

In measurement operation, the apparatus performs in each measuring cycle, for at least two wanted oscillation modes of different frequencies, measurements, in the case of which, in each case, at least one tube section 4,7 is excited to execute oscillations of one of the wanted oscillation modes. During the exciting of a wanted oscillation mode, the resulting oscillation of the one or more excited tube sections 4, 7, is, in each case, preferably metrologically registered by means of at least one sensor S of the sensing system 9. Sensors S, e.g. electrostatic, piezoelectric or magnetic sensors, usable for this purpose, as well as their number and arrangement in relation to the particular tube section 4, 7 required for registering the resulting oscillations are known from the state of the art and are, consequently, not described here in detail. The sensors S can be embodied and/or arranged e.g. in the same manner as in the case of Coriolis mass flow measuring devices or density measuring devices known from the state of the art. In the case of the example of an embodiment illustrated in FIGS. 1 and 3, the sensing system 9 has two sensors S arranged in FIG. 3 on the inlet- and outlet sides in the region of the legs of the arc shaped tube sections 7 for metrological registering of the resulting oscillations.

For determining the damping dependent viscosity of the fluid filling the particular tube section 4, 7, or flowing through such, in the case of the oscillation resulting from exciting its wanted oscillation mode, the apparatus, especially its sensing system 9, can be embodied e.g. in such a manner that it determines the damping, in each case, in the manner described in US 2004/0255648 A1 based on the oscillation quality factor of the particular tube section 4, 7, which factor can be derived e.g. from the width of the resonance peak of its wanted oscillation mode.

Alternatively, the apparatus can be embodied in such a manner that it ascertains the damping, in each case, in a manner described e.g. in EP 1 158 289 B1 or in DE 10 2004 021 690 A1 in connection with mass flow measuring devices based on the energy required for maintaining the particular wanted oscillation mode. This form of embodiment is shown in FIG. 1. There, the exciter system 3 is operated via a control system 11 connected to the sensing system 9 and the exciter system 3 preferably in such a manner that it controls amplitudes measured by means of the sensors S in the case of the oscillation of a particular tube section 4, 7 resulting from exciting its wanted oscillation mode, in each case, to a constant value. The energy requirement required in such case for maintaining the resulting oscillation of constant amplitude depends on the damping, which, in turn, depends on the viscosity of the fluid. Correspondingly, by means of a correspondingly formed energy requirement sensing system 13, a measure for the energy required for this is determined, which measure corresponds to the viscosity dependent damping.

The exciting of the wanted oscillation modes occurs preferably, in each case, at a frequency corresponding to the resonant frequency of its wanted oscillation mode. The exciting of the resonant frequency occurs e.g. in manner known from the state of the art. For this, the apparatus is preferably embodied in such a manner that it maximizes the amplitude of the resulting oscillation measured by means of the sensors S by a corresponding control of the driving frequency and/or controls a phase shift between excitation and resulting oscillation by a corresponding control of the driving frequency to a value corresponding to the resonance.

According to the invention, the apparatus includes an evaluation system 15, which is embodied in such a manner that it determines a shear rate value and a viscosity measured value based on calibration data stored in a memory 17 for the individual wanted oscillation modes excited in measurement operation, in each case, based on the frequency and the damping, as well as, in case required, also the amplitude, of the oscillation of a particular tube section 4, 7 resulting upon the exciting of a wanted oscillation mode. In such case, the shear rate values and viscosity measured values are determined based on the calibration data in such a manner that viscosity measured values correspond to the dynamic viscosity of the fluid at a static shear rate corresponding to the associated shear rate value.

The exciting of a wanted oscillation mode effects an oscillatory movement of the affected tube section 4, 7. In such case, there form in fluid located therein, or in fluid flowing therethrough, shear waves, which penetrate into the fluid starting from a tube wall of the particular tube section and extending to a certain penetration depth h. The penetration depth h is dependent on the frequency of a resulting oscillation, as well as on the dynamic viscosity and the density of the fluid and can be estimated e.g. according to:

$$h = \sqrt{\frac{\eta}{2\pi\rho f}},$$

wherein $\eta$ is the dynamic viscosity, f the frequency of a resulting oscillation and $\rho$ the density of the fluid. In such case, the viscosity dependent damping of the oscillation resulting in the case of the exciting of a wanted oscillation mode rises with rising penetration depth h corresponding to viscosity. Accordingly, there can be measured with apparatuses of the invention viscosities, which lie in a value range, in which the penetration depth h changes as a function of viscosity. The is the case, as long as the penetration depth h is less than a tube radius of the tube section 4, 7. The tube sections 4, 7 of the measuring tubes 5 have radii, which lie in the centimeter or decimeter range. Accordingly, the penetration depth h of apparatuses of the invention is significantly less than the tube radius of the tube section, even at low frequencies, e.g. frequencies in the range of 100 Hz to 1000 Hz.

In the case of apparatuses of the invention, the dimensions of the one or more tube sections 4, 7, as well as their lengths or sublengths deflected upon exciting their wanted oscillation modes as a function of the viscous or the viscous and elastic properties of the fluids, whose shear rate dependent viscosity should be measured, are, preferably, in each case, dimensioned in such a manner that frequencies and damping of oscillations resulting upon exciting the individual wanted oscillation modes have, in each case, no or only a low dependence on the amplitude of the resulting oscillation of a particular tube section 4, 7. This offers the advantage that amplitude of the resulting oscillations needs neither to be measured in measurement operation, nor to be taken into consideration in the determining of the shear rate values and viscosity measured values. Where that is not possible, the amplitudes of the resulting oscillations must be metrologically registered by means of the sensing system 9 and be taken into consideration in the determining of the shear rate values and viscosity measured values using calibration data reflecting the existing amplitude dependence of the measurements.

The calibration data are preferably determined in an earlier calibration procedure. In a first variant for this, for each of the individual wanted oscillation modes, reference measurements are made with Newtonian reference fluids of different known dynamic viscosities and with non-Newtonian reference fluids with viscosity dependent in known manner on shear rate. In these reference measurements, the individual wanted oscillation modes are excited while the tube sections 4, 7 are filled with the reference fluid, or while reference fluid is flowing through the tube sections 4, 7. In such case, the frequency and the damping, as well as, in case required, also the amplitude of a resulting oscillation is measured with the sensing system 9 for each of the wanted oscillations. From this, then the calibration data are derived and stored in the memory 17 associated with the evaluating unit 15.

With apparatuses of the invention, dynamic viscosities of fluids with essentially exclusively viscous properties, such as, for example, oils, can be determined. In the case of these fluids, the measured damping is a direct measure for the dynamic viscosity. For these applications, the reference measurements are preferably made with reference fluids having essentially exclusively viscous properties. In such case, the reference measurements made with the Newtonian reference fluids result in calibration data, which reflect the dependence of the measured damping on the dynamic viscosity of the fluid. Using this calibration data, viscosity measured values can be associated with the damping measured in measurement operation.

Moreover, the reference measurements made with the non-Newtonian reference fluids yield calibration data, via which, in each case, a shear rate value, namely a shear rate value corresponding to the shear rate, can be associated with the measured frequencies, or the measured frequencies and amplitudes, wherein the reference fluid has the dynamic viscosity corresponding to the associated viscosity measured value.

Moreover, apparatuses of the invention can also determine dynamic viscosities of fluids, which have besides purely viscous properties supplementally also elastic properties. In the case of these fluids, the damping includes both a part dependent on the dynamic viscosity as well as also a part attributable to energy losses caused by the elastic properties of the fluid. In the case of these fluids, just as in the case of Newtonian fluids, the damping can, in given cases, depend on the frequency or on the frequency and the amplitude. This dependence is stronger, the greater the part of the damping attributable to the elastic properties of the fluid is. Conversely, in the case of these fluids, also the shear rate value to be associated with the viscosity measured value can depend on the dynamic viscosity of the fluid and/or on the ratio of the viscous and the elastic properties of the fluid. This is taken into consideration in the recording of the calibration data preferably by making reference measurements with reference fluids having differently strongly developed elastic properties compared with their viscous properties. Based on the reference measurements made with these references fluids, the dependencies of the damping measured in measurement operation on the dynamic viscosity and the frequency, or the frequency and the amplitude, as well as the dependence of the shear rate values on the measured damping and the frequency, or the frequency and the amplitude, can be ascertained as a function of the ratio of the viscous and elastic properties of the reference fluids. Alternatively or supplementally, the calibration data comprise for this purpose preferably data ascertained based on reference measurements made with at least one reference fluid, which is identical with, or especially as similar as possible, as regards visco-elastic properties of the fluid, whose shear rate dependent viscosity is to be determined with the apparatus of the invention.

In the case of apparatuses of the invention, wherein the penetration depth h of the shear wave is significantly less, preferably at least by a factor of ten less, than the tube radius of the tube section 4, 7, it can approximately be assumed that there forms in the fluid shearing, for which the rule developed by W. P. Cox and E. H. Merz for oscillation viscosimeters is at least approximately applicable. This rule says that the magnitude of a complex viscosity $|\eta^*|$ of a fluid measured with an oscillation viscosimeter at a certain oscillatory circuit frequency $\omega$ corresponds to the magnitude of the dynamic viscosity $|\eta|$ of the fluid at a static shear rate $f_{stat}$ corresponding to the oscillatory circuit frequency $\omega$. The complex viscosity $\eta^*$ measured in oscillation viscosimeters is composed of a contribution attributable to the elastic properties and a contribution attributable to the viscous properties of the fluid.

In the case of application of this rule to apparatuses of the invention, the damping measured with apparatuses of the invention are, in each case, interpreted as a measured variable corresponding to the complex viscosity measured in an oscillation viscosimeter and are taken into consideration as a measure for the dynamic viscosity of the fluid at a static shear rate corresponding to the frequency of a resulting oscillation.

Thus, the evaluation system 15 is here preferably embodied in such a manner that it determines viscosity measured value based on the damping of resulting oscillation of a particular tube section 4, 7 determined during excitation of its wanted oscillation mode and determines the associated shear rate value based on frequency of a resulting oscillation of a particular tube section 4, 7.

In the case of these apparatuses, the rule derived by W. P. Cox and E. H. Merz for oscillation viscosimeters is preferably taken into consideration in the aforementioned manner already when collecting the calibration data. In that case, the calibration data for each wanted oscillation mode comprise, in each case, data, via which the belonging viscosity measured values are associated with damping of the resulting oscillation of a particular tube section 4, 7 determined during excitation of its wanted oscillation mode and the shear rate values are associated with the frequencies of the resulting oscillation of a particular tube section 4, 7. The calibration data can be determined e.g. in a significantly simplified calibration procedure, in the case of which only the dependencies of the damping on the belonging viscosity measured values are determined, and the shear rate value essentially equals $2\pi$ times frequency of a resulting oscillation. For this, e.g. reference measurements can be made exclusively with Newtonian reference fluids with known, shear rate independent viscosity. Reference measurements with reference fluids with viscosity dependent in known manner on shear rate are not required in such case.

By applying the rule of W. P. Cox and E. H. Merz, acceptable measurement accuracies for fluids with predominantly viscous properties can especially be achieved, when the apparatus is embodied in such a manner that the damping and the frequencies of the oscillations resulting upon exciting the wanted oscillation modes are essentially independent of the amplitude of the resulting oscillations.

Apparatuses of the invention are preferably embodied via dimensioning of the tube sections, especially their cross sectional area, wall thicknesses and lengths, or sublengths, deflected upon exciting the individual wanted oscillation modes in such a manner that the frequencies of the wanted oscillation modes determinative for the measured shear rate values cover a frequency range, which enables measuring dynamic viscosities in a shear rate range, in which viscosities of non-Newtonian fluids typically change as a function of the shear rate.

This frequency range can be estimated at least approximately by applying the aforementioned rule of W. P. Cox and E. H. Merz. In order to be able to measure dynamic viscosities in a shear rate range of less than or equal to 10000 1/s with apparatuses of the invention, preferably wanted oscillation modes are excited, whose frequencies lie below 1600 Hz. Preferably, wanted oscillation modes are excited, whose frequencies are less than or equal to 1000 Hz, preferably even less than or equal to 800 Hz. Thus, dynamic viscosities can be measured in a shear rate range in the order of magnitude of 600 1/s to 5000 1/s, e.g. based on wanted oscillation modes, whose frequencies lie in a frequency range of 100 Hz to 800 Hz.

Apparatuses of the invention offer the advantage that, based on the viscosity measured values determined by them, it can be detected, whether the fluid has a viscosity dependent on shear rate. Moreover, in given cases, a shear rate dependence of viscosity can be quantitatively determined and/or evaluated. The additional information connected therewith can be ascertained by the operator of the apparatus based on viscosity measured values and the belonging shear rate values. Alternatively, this information can also be determined in the apparatus and sent to an output unit 19. For this, the evaluating unit 15 is preferably embodied in such a manner that it detects based on viscosity measured values determined at at least two different measured shear rate values, whether the fluid has a shear rate dependent viscosity. For this, it suffices to check, whether at least two viscosity measured values measured at different measured shear rate values differ from one another by more than a specified minimum difference.

Alternatively or supplementally, the evaluating unit 15 is preferably embodied in such a manner that it creates, based on the viscosity measured values determined at at least two different, measured shear rate values a viscosity profile reflecting viscosity of the fluid as a function of shear rate. To the extent that sufficiently many viscosity measured values determined at measured shear rate values mutually differing in sufficient degree are present, the profile can be directly created based on the viscosity measured values and the associated measured shear rate values. Alternatively or supplementally, the profile can be determined based on a mathematical function, which describes the functional dependence of viscosity of non-Newtonian fluids on the shear rate. In that case, just two viscosity measured values determined at different shear rate values suffice to create an informative profile, via which the shear rate dependence of the viscosity of the fluid can also be extrapolated to shear rate ranges, for which no viscosity measured values were determined.

Alternatively or supplementally, the evaluating unit 15 is preferably embodied in such a manner that it determines based on viscosity measured values determined at different shear rate values, or the profile derived therefrom, whether the fluid is a Newtonian fluid, whose viscosity is essentially independent of the shear rate, or is a shear thinning fluid, whose viscosity falls with increasing shear rate, or is a shear thickening fluid, whose viscosity rises with increasing shear rate.

Moreover, viscosity measured values measured with the apparatus of the invention can also be used to detect changes of viscosity of the fluid and/or differences of the viscosity of the fluid from specifications therefor occurring during ongoing measurement operation. Exactly as in the case of the above described ascertaining of additional information, also the detecting of these changes and/or differences can be performed by the operator of the apparatus based on viscosity measured values. Alternatively, this detecting can, however, also be performed by a detection system 21 connected to the apparatus or integrated into the apparatus and correspondingly displayed or output in some other manner. The function of the detection system 21 can be performed e.g. by a PC equipped with corresponding software, a microprocessor or the like. Alternatively, the detection system 21 can—such as shown here—be embodied as a component of the evaluating unit 15.

The detection occurs preferably in such a manner that the apparatus performs viscosity measurements at times sequentially following one another, wherein, in each case, at least two viscosity measured values and the associated different shear rate values are determined. Following this, the determined viscosity measured values at the shear rate values are compared with reference values stored in a memory 23 associated with the detection unit 21.

The reference values can, for example, comprise desired values or desired value ranges, which are specified for the fluid and which the viscosity of the fluid should have at certain shear rates. In that case, the detection system 21 detects a difference from the specifications defined by the desired values, when at least one viscosity measured value differs from the belonging desired value, or from the belonging desired value range, by more than a specified tolerance. Set as specified tolerance can be, for example, a tolerance specified as a function of the accuracy of measurement of viscosity measurements or a tolerance determined in some other manner, e.g. a tolerance specified by a user. Alternatively or supplementally, the comparison can naturally also be performed based on a viscosity profile produced from the measured viscosity measured values and the associated shear rate values. The latter enables the detection of differences also when the desired values, or the desired value ranges, are known only for shear rates or shear rate ranges, which are different from the shear rate values, for which the viscosity measured values were determined.

Alternatively or supplementally, the reference values can comprise viscosity measured values determined during one or more earlier measurements of the apparatus made at measured shear rate values. In that case, the detection system 21 detects a time change of viscosity of the fluid, when at least one of the current viscosity measured values differs from a belonging reference value measured at an earlier point in time and stored in the memory 23 by more than a tolerance dependent on the accuracy of measurement of viscosity measurements or a tolerance specified by a user.

The additional information as well as the detection of differences and/or changes of viscosity of the fluid are especially advantageous, when the apparatus of the invention is applied at the same time also for measuring other measured variables, e.g. mass flow and/or density and/or viscosity measured values determined by it are used for compensating viscosity dependent measurement errors in density and/or mass flow measurements.

If a tube section 4, 7 of an apparatus of the invention flowed through by the fluid is excited by means of the exciter system 3 to execute oscillations, there arise in the tube section 4, 7 Coriolis forces, which affect the resulting oscillation form of the tube section 4, 7. That leads in the case of the examples of embodiments illustrated here to the fact that the oscillations registered with the inlet- and outlet side sensors S provided on the particular tube section 4, 7 have frequencies of the resulting oscillation form, which are equal but phase-shifted relative to one another by a phase shift dependent on the mass flow. This phase shift can then be ascertained e.g. by means of a measuring unit 25, which is connected to the sensors S and which then determines the mass flow based on the measured phase shift. Alternatively or supplementally, the apparatus can be applied for measuring density. In that case, at least one tube section 4, 7 of the measuring system 1 is excited by means of the exciter system 3 and the control system 11 to execute oscillations at a resonant frequency. In such case, the resonant frequency dependent on density is ascertained by means of the measuring unit 25 connected to the oscillation sensors S and density of the fluid determined therefrom. If the sensing system is also operated as a density sensing system, that offers the advantage that the viscosity measured values corresponding to the dynamic viscosities can be converted based on the measured density into viscosity measured values corresponding to the belonging kinematic viscosity. At the same time, density- and viscosity measurements can be used to correct density dependent, measurement error of viscosity measured values and/or viscosity dependent, measurement error of the measured densities.

LIST OF REFERENCE CHARACTERS

| | |
|---|---|
| 1 | measuring system |
| 3 | exciter system |
| 4 | tube section |
| 5 | measuring tube |
| 7 | tube section |
| 9 | sensing system |
| 11 | control system |
| 13 | energy requirement sensing system |
| 15 | evaluation unit |
| 17 | memory |
| 19 | output unit |
| 21 | detection system |
| 23 | memory |
| 25 | measuring unit |

The invention claimed is:

1. An apparatus for measuring viscosities of fluids having a having a complex viscosity, wherein a contribution attributable to viscous properties is large compared with a contribution attributable to elastic properties or of fluids having a viscosity having essentially exclusively viscous properties, the apparatus comprising a measuring system having at least one measuring tube, which in measurement operation is filled with a fluid or through which fluid is flowing, and which has at least one tube section excitable to execute oscillations, an exciter system configured to excite at least two wanted oscillation modes of different frequencies, at each of which at least one of the tube sections is excited to execute oscillations, especially resonant oscillations, a sensing system configured to, for the wanted oscillation modes excited in measurement operation, in each case determine properties of a resulting oscillation of the at least one tube section excited to execute oscillations of one of the wanted oscillation modes, and an evaluation system configured to for the wanted oscillation modes excited in measurement operation, in each case determine based on calibration data stored in a memory for the individual wanted oscillation modes excited in measurement operation and based on the properties of the resulting oscillation determined during excitation of the wanted oscillation mode a shear rate value and a viscosity measured value, wherein the viscosity measured value corresponds to the dynamic viscosity of the fluid at a static shear rate corresponding to the shear rate value, wherein the one or more tube sections excitable to wanted oscillations have, in each case, a tube radius, which is greater than or equal to ten times a penetration depth, to which shear waves forming upon exciting the tube section to execute oscillations of a wanted oscillation mode penetrate into the fluid starting from a tube wall of the tube section and extending into the fluid, wherein the properties are either:

a) a frequency and a damping of the resulting oscillations in case a tube radius and a length or sublength of each tube section deflected upon the exciting of a wanted oscillation mode are each dimensioned such that frequencies and damping of oscillations resulting from exciting the individual wanted oscillation modes have, in each case, no or only a low dependence on the amplitudes of the resulting oscillations, or b) a frequency, a damping, and an amplitude of the resulting oscillations, wherein the evaluation unit is embodied in such a manner that it determines a viscosity measured value based on damping of a resulting oscillation of a particular tube section during excitation of its wanted oscillation mode, and an associated measured shear rate based on frequency of a resulting oscillation of the particular tube section.

2. The apparatus as claimed in claim 1, wherein the evaluation system is embodied in such a manner that, based on at least two viscosity measured values determined at different shear rate values, it creates a viscosity profile reflecting viscosity of the fluid as a function of shear rate, it detects, whether viscosity of the fluid has a shear rate dependence, and/or based on viscosity measured values determined at different shear rate values, it determines whether the fluid is a Newtonian fluid, whose viscosity is essentially independent of shear rate, or is a shear thinning fluid, whose viscosity falls with increasing shear rate, or is a shear thickening fluid, whose viscosity rises with increasing shear rate.

3. The apparatus as claimed in claim 1, further comprising a detection system for detecting during measurement operation changes of the fluid and/or differences of the viscosity of the fluid from specifications therefor, wherein the detection system is embodied in such a manner that it compares viscosity measured values determined at the measured shear rate values or viscosity measured values determined based on the viscosity profile, with reference values, especially specified desired values or specified desired value ranges stored in a memory and/or viscosity measured values stored in a memory and determined at one or more earlier points in time at shear rate values determined by the apparatus, and it detects a change and/or difference, when at least one viscosity measured values differs from a belonging reference value by more than a specified tolerance, especially a tolerance specified as a function of the accuracy of measurement of viscosity measurement or a tolerance specified by a user.

4. The apparatus as claimed in claim 1, wherein the calibration data comprise data ascertained for each wanted oscillation mode in earlier calibration procedures, via which shear rate values and viscosity measured values are associated with the properties measured in measurement operation upon exciting the wanted oscillation modes, or the calibration data comprise data ascertained for each wanted oscillation mode in earlier calibration procedures, via which viscosity measured values are associated with damping measured in measurement operation upon exciting the wanted oscillation modes and shear rate values are associated with measured frequencies, wherein the shear rate values essentially equal $2\pi$ times frequency of a resulting oscillation of a particular tube section.

5. The apparatus as claimed in claim 1, further comprising, connected to the sensing system, a measuring unit, which is embodied in such a manner that in measurement operation it determines a mass flow and/or a density of the fluid based on an oscillation resulting in the case of exciting at least one of the wanted oscillation modes.

6. The apparatus as claimed in claim 1, wherein:

the wanted oscillation modes have frequencies of less than or equal to 1600 Hz, especially less than or equal to 1000 kHz, especially less than or equal to 800 Hz, especially from 100 Hz to 800 Hz.

7. The apparatus as claimed in claim 1, wherein:

the evaluation system is embodied in such a manner that it determines shear rate value and viscosity measured value for the individual wanted oscillation modes excited in measurement operation, in each case, based on an excitation determined frequency, amplitude and damping of resulting oscillations, or a tube radius and a length or sublength of each tube section deflected upon the exciting of a wanted oscillation mode are dimensioned, in each case, in such a manner that frequencies and damping of oscillations resulting from exciting the individual wanted oscillation modes have, in each case, no or only a low dependence on the amplitudes of the resulting oscillations and the evaluation system is embodied in such a manner that it determines shear rate value and viscosity measured value for the individual wanted oscillation modes excited in measurement operation, in each case, based on excitation determined frequencies and damping of resulting oscillations.

8. A method for measuring viscosities of a fluid having a complex viscosity, wherein a contribution attributable to viscous properties is large compared with a contribution attributable to elastic properties or of a fluid having a viscosity having essentially exclusively viscous properties, wherein measurements are performed for at least two wanted oscillation modes of different frequencies, wherein:

in each case, at least one tube section of at least one measuring system measuring tube, which is filled with a fluid and/or through which fluid is flowing, is excited by means of an exciter system to execute oscillations, especially resonant oscillations, of the wanted oscillation mode, the one or more tube sections excitable to wanted oscillations have, in each case, a tube radius, which is greater than or equal to ten times a penetration depth, to which shear waves forming upon exciting the tube section to execute oscillations of a wanted oscillation mode penetrate into the fluid starting from a tube wall of the tube section and extending into the fluid, and properties of the resulting oscillation of at least one tube section excited to execute oscillations of the wanted oscillation mode are determined, and a shear rate values and a viscosity measured value are determined based on calibration data determined by a calibration procedure and the properties of the resulting oscillation determined during excitation of the wanted oscillation mode, wherein the viscosity measured values correspond to dynamic viscosities of the fluid at static shear rates corresponding to shear rate values, wherein the properties are either:

a) a frequency and a damping of the resulting oscillations in case a tube radius and a length or sublength of each tube section deflected upon the exciting of a wanted oscillation mode are each dimensioned such that frequencies and damping of oscillations resulting from exciting the individual wanted oscillation modes have, in each case, no or only a low dependence on the amplitudes of the resulting oscillations, or b) a frequency, a damping, and an amplitude of the resulting oscillations, and the viscosity measured value is determined based on the damping of a resulting oscillation of a particular tube section determined during excitation of its wanted oscillation mode and the associated shear rate value is determined based on the frequency of a resulting oscillation of the tube section.

9. The method as claimed in claim 8, wherein:

the wanted oscillation modes have frequencies of less than or equal to 1600 Hz, especially less than or equal to 1000 kHz, especially less than or equal to 800 Hz, especially from 100 Hz to 800 Hz.

10. The method as claimed in claim 8, wherein:

in the calibration procedure for each of the individual wanted oscillation modes reference measurements are performed, in the case of which the wanted oscillation mode is excited while the corresponding tube section is filled with a reference fluid and/or is flowed through by the reference fluid and wanted mode excitation determined properties of resulting oscillations are measured, wherein the reference measurements comprise reference measurements made with Newtonian reference fluids of different, known, dynamic viscosities, and wherein there is associated with each measured frequency a shear rate value, which essentially equals $2\pi$ times frequency of a resulting oscillation of the particular tube section and/or the reference measurements comprise reference measurements made with non-Newtonian reference fluids with viscosity dependent in known manner on shear rate, wherein the reference measurements comprise especially reference measurements made with reference fluids with differently strongly developed elastic properties compared with their viscous properties, and for each wanted oscillation mode calibration data are determined, via which a shear rate value and a viscosity measured value are associated with the properties measured in measurement operation upon exciting the wanted oscillation mode.

11. The method as claimed in claim 8, wherein based on at least two viscosity measured values determined at different shear rate values a viscosity profile reflecting viscosity of the fluid as a function of shear rate is created, it is detected whether viscosity of the fluid has a shear rate dependence, and/or based on viscosity measured values determined at shear rate values, it is determined whether the fluid is a Newtonian fluid, a shear thinning fluid or a shear thickening fluid.

12. The method as claimed in claim 8, wherein changes of the fluid and/or differences of the viscosity of the fluid from specifications therefor occurring during measurement operation are detected, in that viscosity measured values determined at measured shear rate values are compared with reference values, especially with specified desired values, with specified desired value ranges or with viscosity measured values determined at one or more earlier points in time at measured shear rate values, and a change and/or difference is detected, when at least one viscosity measured value deviates from a belonging reference value by more than a specified tolerance, especially a tolerance specified as a function of an accuracy of measurement of viscosity or a tolerance specified by a user.

\* \* \* \* \*